United States Patent
Donley

(10) Patent No.: US 10,916,157 B1
(45) Date of Patent: Feb. 9, 2021

(54) GUITAR NECK REAR ADHESIVE DECAL

(71) Applicant: Christopher Taylor Donley, Orlando, FL (US)

(72) Inventor: Christopher Taylor Donley, Orlando, FL (US)

(73) Assignee: Christopher Taylor Donley, Orlando, FL (US)

( * ) Notice: Subject to any disclaimer, the term of this patent is extended or adjusted under 35 U.S.C. 154(b) by 0 days.

(21) Appl. No.: 17/033,673

(22) Filed: Sep. 25, 2020

Related U.S. Application Data

(60) Provisional application No. 62/906,416, filed on Sep. 26, 2019.

(51) Int. Cl.
*G09B 15/00* (2006.01)
*G10D 3/06* (2020.01)

(52) U.S. Cl.
CPC ............. *G09B 15/001* (2013.01); *G10D 3/06* (2013.01)

(58) Field of Classification Search
CPC ................................ G09B 15/001; G10D 3/06
See application file for complete search history.

(56) References Cited

U.S. PATENT DOCUMENTS

| | | | | |
|---|---|---|---|---|
| 663,187 A * | 12/1900 | Ropp | ....................... | G10D 3/06 84/314 R |
| 852,407 A * | 4/1907 | Galbraith | ................. | G10D 3/06 84/314 R |
| 2,455,574 A * | 12/1948 | Feldman | ................... | G10D 3/00 84/314 R |
| 3,481,238 A * | 12/1969 | Veres | ....................... | G10D 3/06 84/267 |
| 4,095,506 A * | 6/1978 | Smith | ..................... | G09B 15/06 84/314 R |
| 4,237,765 A * | 12/1980 | Valdez | ..................... | G10D 1/08 84/293 |
| 4,712,464 A * | 12/1987 | Nance | ...................... | G10D 3/06 84/453 |
| 4,759,250 A * | 7/1988 | Lieber | ...................... | G10D 3/06 84/293 |
| 4,953,435 A * | 9/1990 | Chapman | ................. | G10D 3/06 84/293 |
| 5,239,908 A * | 8/1993 | Attias | ...................... | G10D 3/06 84/267 |
| 5,373,768 A * | 12/1994 | Sciortino | ................. | G10D 3/00 362/253 |
| 5,445,058 A * | 8/1995 | Hoke, Jr. | ................. | G10D 3/22 84/293 |

(Continued)

FOREIGN PATENT DOCUMENTS

| DE | 102011008334 A1 * | 7/2012 | ............... G10D 3/06 |
|---|---|---|---|
| WO | WO-0124159 A1 * | 4/2001 | ............... G10G 1/02 |

*Primary Examiner* — Robert W Horn

(57) ABSTRACT

A device for assisting in the learning and playing of stringed instruments, allowing for nonspecific reference points. The device is an individual decal or set of decals in the form of textured adhesive strips. The texture consists of an anti-slip material made with an abrasive or nonabrasive grit or beveled, smooth surface. The decals are placed on the back of the neck of the stringed instrument at the user's preferred location perpendicular, parallel or at an angle to the direction of the neck serving as a reference point for the intention of playing the instrument without the need to look at the instrument or designated hand positioning.

6 Claims, 2 Drawing Sheets

(56) References Cited

U.S. PATENT DOCUMENTS

| | | | | |
|---|---|---|---|---|
| D370,939 S | * | 6/1996 | Schaeffler | D17/20 |
| 5,920,023 A | * | 7/1999 | Ravagni | G09B 15/06 84/470 R |
| 5,977,462 A | * | 11/1999 | Wolfson | G10D 3/06 84/267 |
| 6,034,310 A | * | 3/2000 | Kolano | G10D 1/085 84/293 |
| 6,452,080 B1 | * | 9/2002 | Coonce | G09B 15/06 84/314 R |
| 8,399,756 B1 | * | 3/2013 | Trent | G10D 3/06 84/485 R |
| 8,637,753 B2 | * | 1/2014 | Zelinsky | G10D 3/06 84/293 |
| 8,754,312 B2 | * | 6/2014 | Wilson | G10D 3/18 84/291 |
| 9,029,670 B2 | * | 5/2015 | Strandberg | G10D 3/06 84/293 |
| D735,801 S | * | 8/2015 | Stone | D17/20 |
| 10,504,378 B1 | * | 12/2019 | Weston | G09B 15/026 |
| 10,672,290 B1 | * | 6/2020 | Chason | G09B 15/004 |

* cited by examiner

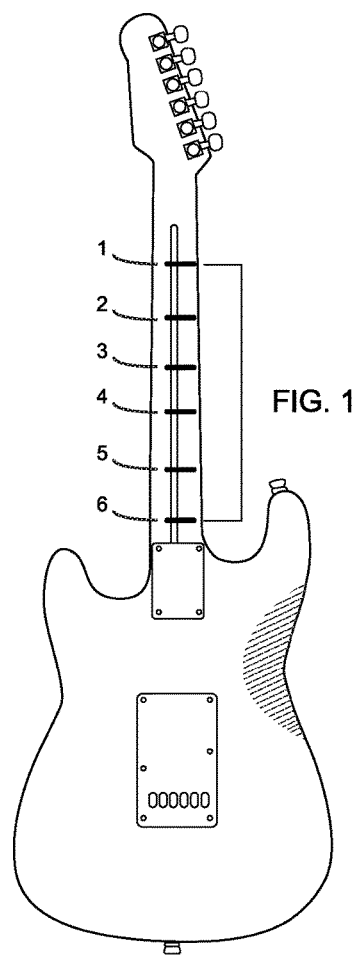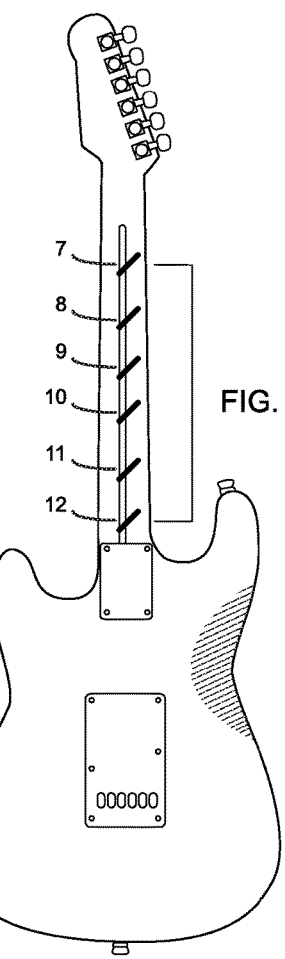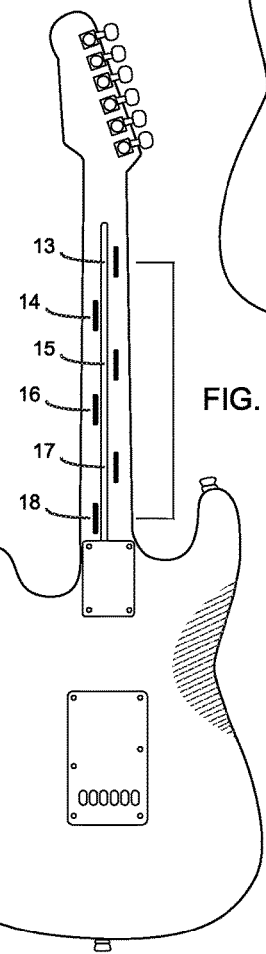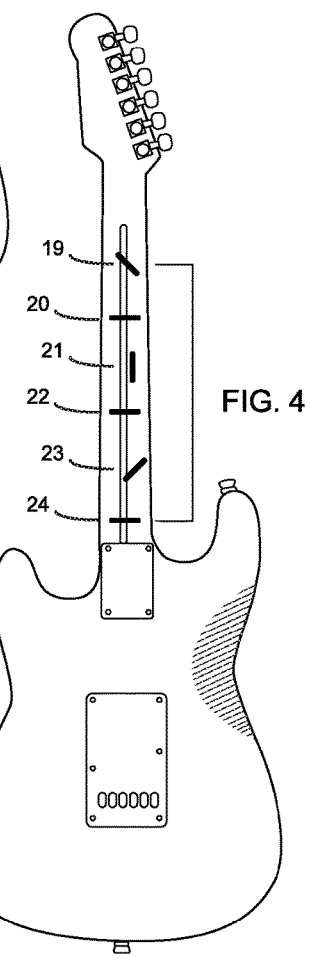

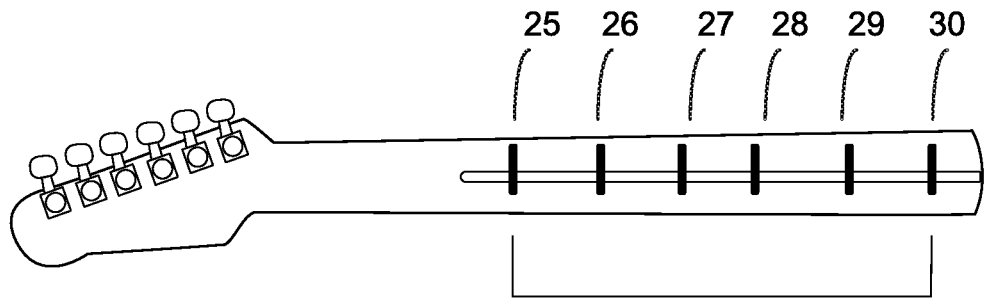
FIG. 5
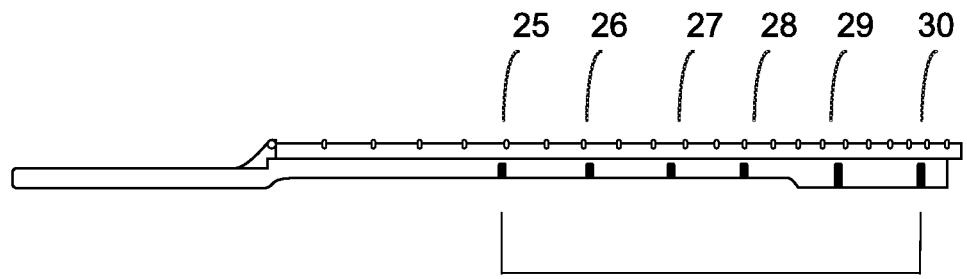
FIG. 6
FIG. 7
FIG. 8
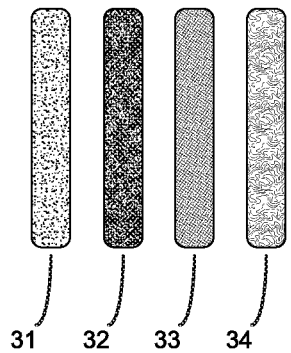
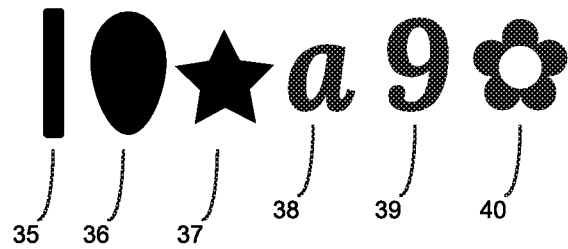

GUITAR NECK REAR ADHESIVE DECAL

CROSS-REFERENCE TO RELATED APPLICATIONS

USPTO Application No. 62/906,416

FIELD OF THE INVENTION

This device relates to aiding in the teaching, learning and playing of stringed instruments, and is particularly applicable to fretted stringed instruments.

BACKGROUND OF THE INVENTION

In general, playing a stringed instrument such as guitar often requires a high level of expertise typically ranging five or more years to fluently play the instrument without visually monitoring your hand and finger position along the instrument's neck. Typically, when playing the guitar, the proper playing position for the hand designated for the fretboard and neck require for said hand's thumb to be placed along the back of the guitar neck near the horizontal center. Generally, the back of the neck of the stringed instrument includes a smooth surface with no tactile indications of the fret positions that are located on the opposite side, which is the fretboard. The remaining fingers of that hand are wrapped around to the front of the neck and arranged along the fretboard to play single notes and to form chord patterns. To progress between chords or notes within a progression, song or melody, the guitarist often moves or slides the designated hand for the fretboard along the neck to the precise, intended location while keeping that hand's thumb on or closely near the horizontal center of the back of the neck.

Although a variety of basic two to four chord progressions can be played at the same fret position, the majority of chord progressions and alternate chord positions are played at different locations along the fretboard. An A minor chord in standard tuning, for example, can be played starting at the first fret and also in an alternate position starting at the fifth fret. Furthermore, if playing a progression, the next chord may be a D minor chord which can also start at the first fret and alternatively at the fifth fret. When alternating between these chord positions along the fretboard, the guitarist must be familiar with the fret at which each chord begins, or else fingering positions may be inaccurate if the guitarist is not visually monitoring hand and finger placement. Inaccurate hand and finger positioning can cause for notes and chords to be played incorrectly.

When learning or playing the guitar with the intention of minimizing inaccuracies, guitarists typically glance at the fretboard or at the indicators located at the top of the fretboard. However, when playing in a live environment in which vision may be frequently occupied or impaired by external factors, guitarists typically aim to reduce the amount of eye contact used on visually monitoring hand and finger placement along the guitar neck. Without the proper expertise, playing guitar without visually monitoring the fretboard can be both challenging and difficult to guitarists of many skill levels ranging from novice to advanced as the smooth back of the neck of the guitar presents no tactile cues for moving along the neck.

BRIEF SUMMARY OF THE INVENTION

The device is designed for the learning and playing of stringed instruments having a fretboard and neck and held by the user. The device includes an individual or a set of removable, thin, textured and applicable adhesive decals to be placed along the length of the back of the instrument neck. The decal does not include any specific reference to musical notes as to allow the user to place one to multiple decals at a personalized location along the back of the instrument neck.

In advantageous embodiments, the device is comprised of a textured abrasive or nonabrasive grit on the surface opposite the adhesive. The adhesive is protected by a paper backing that is removed prior to applying the decal to the back of the instrument neck. Furthermore, in a preferred embodiment, the textured surface includes colors, images or patterns printed on the decal. The preferred embodiment is also comprised of an ellipse, polygonal shape, alphanumeric character or symbol for each individual decal or set of decals.

In various embodiments, the device is adhered along the length of the back of the neck of the stringed instrument at a user-preferred location in a perpendicular, parallel or angled orientation.

This device applies to a variety of stringed instruments, such as guitar, bass, mandolin, banjo and ukulele.

BRIEF DESCRIPTION OF THE DRAWINGS

FIG. 1 provides a rear view of the preferred embodiment of the present invention aligned in a perpendicular orientation along the back of the fretboard of a stringed instrument.

FIG. 2 provides a rear view of an alternative embodiment aligned in an angled orientation along the back of the fretboard of a stringed instrument.

FIG. 3 provides a rear view of an alternative embodiment aligned in a parallel orientation along the back of the fretboard of a stringed instrument.

FIG. 4 provides a rear view of an alternative embodiment aligned in a random orientation along the back of the fretboard of a stringed instrument.

FIG. 5 provides a closeup rear view of the fretboard of a stringed instrument adhered with the present invention.

FIG. 6 provides a top view of the fretboard of a stringed instrument adhered with the present invention.

FIG. 7 provides a closeup view of the present invention in a representation of possible textures that the decals may include on the outer surface opposite the adhesive backing.

FIG. 8 provides a view of possible shapes and characters into which the present invention may be embodied.

DETAILED DESCRIPTION OF THE INVENTION

Referring now to a preferred embodiment of the invention, FIG. 1 provides a rear view of a stringed musical instrument, more particularly a stratocaster guitar, adhered with the present invention represented as a series of decals 1, 2, 3, 4, 5, and 6. This representation displays the present invention embodied as thin, rectangular shapes adhered along the rear of the neck in an orientation perpendicular to the fretboard. FIG. 2 also provides a rear view of a stratocaster guitar adhered with the invention as a series of thin, rectangular decals 7, 8, 9, 10, 11, and 12 in an angled orientation along the neck. FIG. 3 provides a rear view of the stratocaster guitar adhered with the invention as a series of thin, rectangular decals 13, 14, 15, 16, 17, and 18 in a parallel orientation along the neck. FIG. 4 provides a rear view of the stratocaster guitar adhered with the invention as a series of thin, rectangular decals 19, 20, 21, 22, 23, and 24 with each decal in a random assortment of orientations. More specifically, the random orientation of decals in FIG. 4 consists of decals 19 and 23 with an angled orientation; decals 20, 22, and 24 with an orientation perpendicular to the neck; and decal 21 with an orientation parallel to the neck.

FIG. 5 provides a closeup view of the rear of the neck of the stratocaster guitar adhered with the present invention as a series of thin, rectangular decals 25, 26, 27, 28, 29, and 30 aligned in an orientation that is perpendicular to the neck. In further detail, FIG. 6 provides a top closeup view of the rear of the neck of the stratocaster guitar adhered with the present invention as a series of thin, rectangular decals 25, 26, 27, 28, 29, and 30 in an example of a user's preferred placement. In the particular placement example provided by FIG. 6, decals 25 and 26 are approximately two frets apart; decals 26, 27, and 28 are approximately two and a half frets apart; decals 28 and 29 are approximately three and a half frets apart; and, decals 29 and 30 are approximately four frets apart. Although FIG. 1, FIG. 2, FIG. 3, FIG. 4, FIG. 5 and FIG. 6 show embodiments of the invention in a particular location, the user of the invention may place the decals in a personalized location and orientation along the rear of the neck of the stringed instrument specific to the user's needs or preference.

FIG. 7 provides a closeup view of the present invention as a group of thin, rectangular decals 31, 32, 33, and 34, possessing the possible textures on the outer surface opposite the side of the adhesive backing of which the decals are comprised. These textures allow for the user to feel each decal with the thumb or portion of the designated hand when playing the stringed instrument and serve as a user-preferred marker or tactile cue along the rear of the neck. This offers the user the advantage of playing the stringed instrument without the need to look at the neck of the instrument in order to determine precise hand placement.

FIG. 8 provides an example set of shapes and characters into which the present invention may be embodied. Moreover, the shapes and characters of the decals are shown as the following: decal 35 as a thin, rectangular strip; decal 36 as the shape of an ellipse; decal 37 as a polygonal shape, more specifically a five-point star; decal 38 as a character of the Roman alphabet, more specifically a lowercase letter "a"; decal 39 as an English numeric character, more specifically, the number "9"; and, decal 40 as a pictogram, more specifically in the shape of a daisy. All of the shapes and characters included in FIG. 8 are merely examples of the types of embodiments into which the decals of the present invention may be comprised and are not limited to what has been shown in the figures. Alternate shapes, additional pictograms and the remaining alphanumeric and special characters may also be used to define the shape of the embodiment of the decals of the present invention.

The top surface of each decal 31 in a preferred embodiment is comprised of a nonabrasive, anti-slip textured material made of miniscule, rounded granules. Alternatively, in various embodiments, the top surface of each decal 32 is comprised of an abrasive, anti-slip material made of light-weight sandpaper grit. In alternate embodiments, the top surface of each decal 33 is comprised of a nonabrasive, anti-slip material slightly raised in a grid-like pattern made of a Polyurethane polymer. In an additional embodiment, the top surface of each decal 34 is comprised of a nonabrasive, anti-slip material embossed in an indeterminate pattern and made of a foamed Polyurethane polymer. Furthermore, the top surface of each decal 31, 32, 33, and 34 may be marked with different colors, images and patterns; however, no specific reference to notes are marked on the decals to allow the user to place any individual decal in a personalized location along the rear of the neck.

The bottom surface of each decal 31, 32, 33, and 34 is comprised of an adhesive that is protected by a removable, paper liner (not pictured).

These figures of the various embodiments of the present invention along with the accompanying descriptions provide a practical exhibition of a unique solution for the issue of lacking tactile cues on the back surface of a fretted stringed musical instrument. Moreover, the present invention demonstrates a novel application of allowing the user to utilize tactile cues and markers by adhering decals along the back of the neck of the stringed instrument that are not specified to a particular or corresponding note location.

What is claimed is:

1. A device for stringed instruments with a neck and a fretted fingerboard, comprising:
    a thin, adhesive decal textured with an abrasive or nonabrasive anti-slip grit, configured for semi-permanent placement along the length of the rear of a stringed instrument's neck, wherein
    each decal is placed in a user-preferred location and orientation to serve as a tactile cue with the purpose of temporarily marking a position on the rear of the stringed instrument neck; wherein
    each decal is embodied as an ellipse, polygonal shape, alphanumeric character or symbol; and,
    each decal includes a low-tack adhesive preserved by a removable, disposable paper backing.

2. The device of claim 1, wherein each decal is printed with a color, an image or a pattern on the textured surface of the decal opposite the adhesive backing.

3. The device of claim 1, wherein the dimensions of each decal are no longer than the width of the neck of the stringed instrument and no wider than the standard average space between two singular frets on the neck of the stringed instrument.

4. The device of claim 1, wherein each decal is removable from the rear of the neck of the stringed instrument without damaging the instrument or leaving substantial residue.

5. The device of claim 1, further comprising a plurality of individual decals to mark a plurality of locations along the neck of the rear of the stringed instrument based on the user preference.

6. The device of claim 1, wherein each decal is not marked for a specific note location of the stringed instrument.

* * * * *